No. 666,279. Patented Jan. 22, 1901.
A. LESSER.
AUTOMATICALLY ACTING MOUSE TRAP.
(Application filed Mar. 5, 1900.)

(No Model.) 2 Sheets—Sheet 1.

No. 666,279. Patented Jan. 22, 1901.
A. LESSER.
AUTOMATICALLY ACTING MOUSE TRAP.
(Application filed Mar. 5, 1900.)
(No Model.) 2 Sheets—Sheet 2.

UNITED STATES PATENT OFFICE.

ALFRED LESSER, OF CASSEL, GERMANY.

AUTOMATICALLY-ACTING MOUSE-TRAP.

SPECIFICATION forming part of Letters Patent No. 666,279, dated January 22, 1901.

Application filed March 5, 1900. Serial No. 7,401. (No model.)

*To all whom it may concern:*

Be it known that I, ALFRED LESSER, a subject of the King of Prussia, Emperor of Germany, residing at Cassel, Prussia, Germany, have invented certain new and useful Improvements in Automatically-Acting Mouse-Traps, of which the following is a specification.

This invention relates to an automatically-acting mouse-trap offering, as compared with similar constructions hitherto known, essential advantages. The characteristic feature of all automatic mouse-traps consists in the fact that the caught animal is constrained to continue a determined way and to reset, by doing so, the trap for the following animal. All devices of this kind hitherto known suffer from the drawback that either they are too complicated, and in consequence thereof too dear, or they do not act sufficiently rapidly and surely. In all these traps a bait lies either free or it is inclosed in a perforated casing made of sheet metal or wire, or it does not lie upon the bottom of the trap, but is suspended at a certain height, so that the caught animal cannot touch it. In the latter case it is very probable that the animal generally does not enter the trap if it does not see the bait freely lying there. In the former case the animal when caught rests quietly near the bait, feeding on the latter, and as it does not continue its way does not reset the trap, so that the catching of a large number of animals is retarded or rendered even entirely impossible.

In the present invention, though of very simple construction, the disadvantage above mentioned is avoided, as, the trap being open, the bait is freely lying therein on the bottom, so that it may easily be seen from any side; but at the moment when an animal goes into the trap the bait will disappear before the eyes of the animal as soon as the entrance-door is closed by falling down.

The invention is shown in the accompanying drawings.

Figure 1:
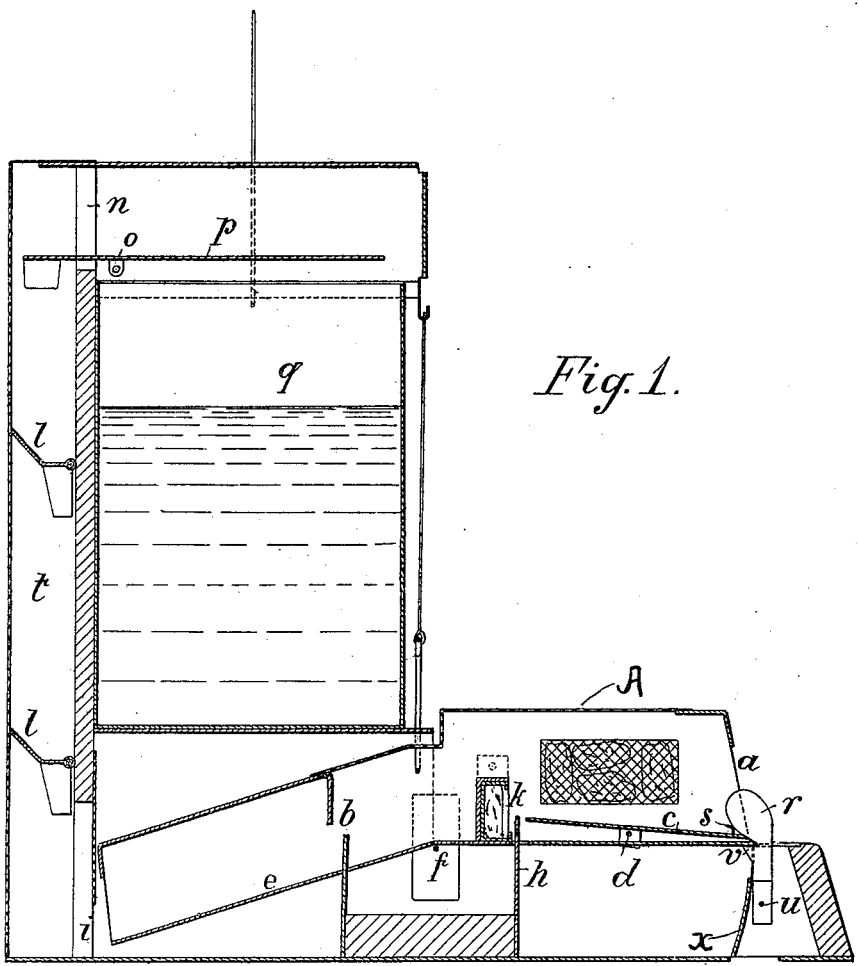
Figure 2:
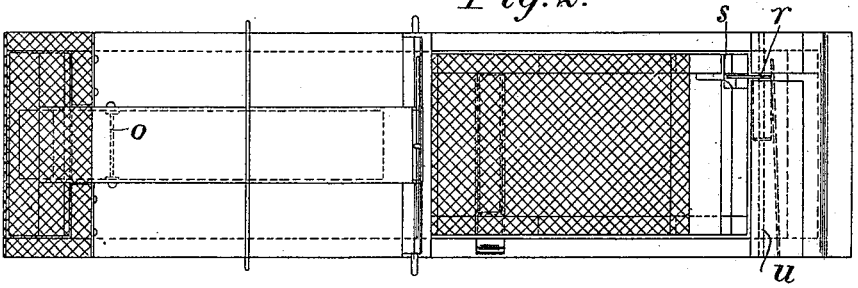
Figure 3:
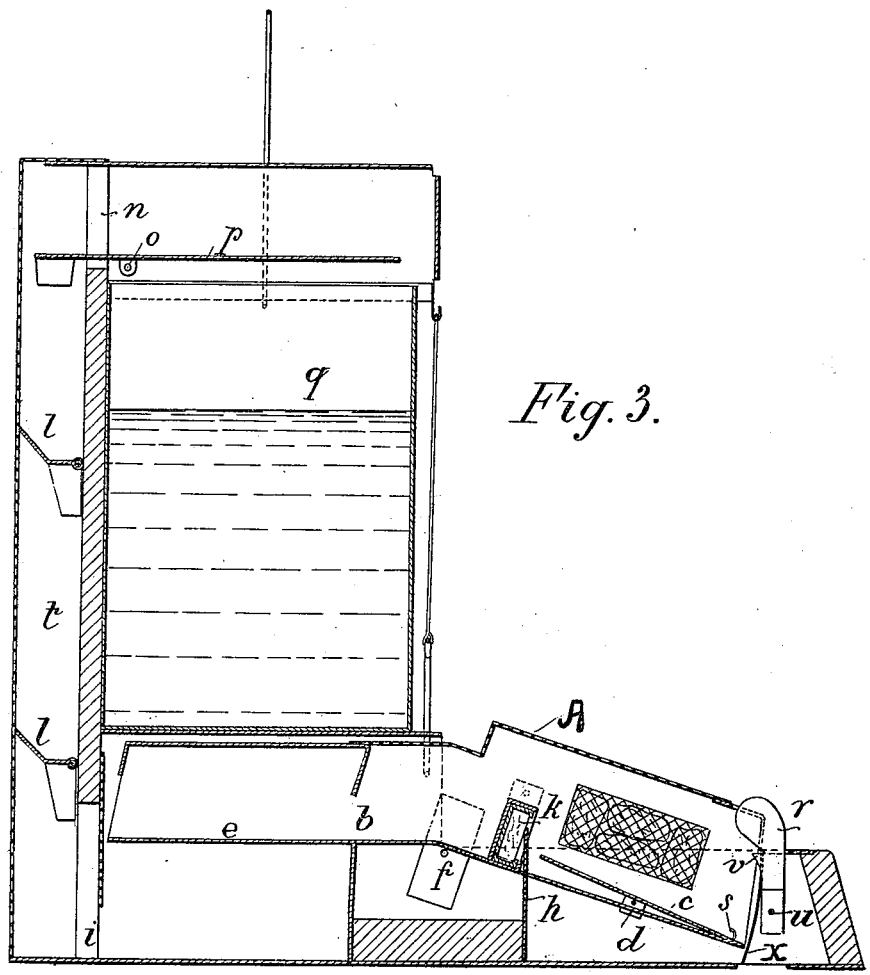

Figure 1 is a longitudinal section of the trap; Fig. 2, a plan view of the same, while Fig. 3 shows the trap, also in longitudinal section, after the entrance of an animal.

A is a tilting box-like receptacle with open ends, and $a$ is the entrance-opening thereof.

$c$ is a platform pivoted at $d$ within the receptacle and adapted to disengage the locking mechanism as soon as the animal treads upon the rear portion of the platform. The bait, which is at $k$, is exposed to view when the trap is set, but is concealed by a wall $h$, which enters the receptacle on the descent of the entrance end of the latter, as shown in Fig. 3. The disengagement of the mechanism is effected by the platform $c$ rocking on its pivot $d$ and causing the pawl $r$, with the shoulder $v$, to turn around the fulcrum $u$, so that the fore part of the tilting receptacle sinks down. On one hand the entrance-opening $a$ is then closed by a shield $x$ and on the other hand the door $b$ is opened, while at the same time the bait is concealed by the wall $h$. The caught animal can pass only through the door $b$, and as soon as it takes this way and has arrived beyond the fulcrum $f$ the tilting receptacle resumes its former position, the rear part of the receptacle, weighted by the animal, sinking down, and the pawl $r$ becoming reëngaged. The door $a$ is reopened, the bait lies free again, and the door $b$ is closed. By the descent of the tilting receptacle the caught animal arrives at the opening $i$ and slips through it into the shaft $t$. The animal climbing in the latter upward overcomes the pivoted flap-doors $l$ $l$, barring the way back, and finally it arrives through the opening $n$ to the swiveling plate $p$, pivoted at $o$, from whence it falls down into the water vessel $q$. The latter can be withdrawn from the trap for being emptied.

I claim—

1. In an animal-trap, the combination of the tilting receptacle, means for locking its entrance end in elevated position, the platform pivoted within the receptacle and adapted to release the locking means, and the shield arranged to close the entrance-opening on the depression of the receptacle, substantially as described.

2. In an animal-trap, the combination of the tilting receptacle, the gravity-pawl for locking it in elevated position, the platform pivoted within the receptacle in position to disengage the pawl, the bait-holder also located within the receptacle, and means for concealing the holder on the depression of the entrance end of the receptacle, substantially as set forth.

3. In an animal-trap, the combination of the tilting receptacle, the locking means therefor, the means for disengaging the locking means, the shield $x$, the bait-holder, the wall $h$, and the door $b$, substantially as set forth.

4. In an animal-trap, the combination of the tilting receptacle, the locking and releasing means therefor, the water vessel above the receptacle, the shaft leading from the rear of the receptacle to the vessel, and the flap-doors located in the shaft, substantially as set forth.

In witness whereof I have hereunto signed my name in the presence of two subscribing witnesses.

ALFRED LESSER. [L. S.]

Witnesses:
GEORG HAUSMANN,
FRIEDRICH EBRECHT.